United States Patent
Matsuo

(10) Patent No.: US 9,250,384 B2
(45) Date of Patent: Feb. 2, 2016

(54) MULTICORE FIBER

(71) Applicant: FUJIKURA LTD., Tokyo (JP)

(72) Inventor: Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/140,055

(22) Filed: Dec. 24, 2013

(65) Prior Publication Data

US 2014/0178018 A1    Jun. 26, 2014

(30) Foreign Application Priority Data

Dec. 25, 2012   (JP) ................................. 2012-280727

(51) Int. Cl.
*G02B 6/255*   (2006.01)
*G02B 6/02*    (2006.01)

(52) U.S. Cl.
CPC ............ *G02B 6/02042* (2013.01); *G02B 6/255* (2013.01); *G02B 6/2558* (2013.01)

(58) Field of Classification Search
CPC .............................. G02B 6/2558; G02B 6/255
See application file for complete search history.

(56) References Cited

U.S. PATENT DOCUMENTS

| | | | |
|---|---|---|---|
| 6,439,782 B1 * | 8/2002 | Otani et al. | 385/96 |
| 2011/0032604 A1 * | 2/2011 | Rothenberg et al. | 359/341.4 |
| 2011/0222828 A1 * | 9/2011 | Sasaoka et al. | 385/127 |

OTHER PUBLICATIONS

H. Takara et al., "1000-km 7-core fiber transmission of 10×96-Gb/s PDM-16QAM using Raman amplification with 6.5 W per fiber" Optics Express, vol. 20, Issue 9, 2012, pp. 10100-10105.
T. Hayashi et al., "Low-Loss and Large-Aeff Multi-core Fiber for SNR Enhancement", ECOC, Optical Society of America Washington, DC, 2012, Mo. 1, F. 3.
K. Imamura et al., "Multi Core Fiber with Large Aeff of 140 m2 and Low Crosstalk", ECOC, Optical Society of America Washington, DC, 2012, Mo. 1, F. 2.

* cited by examiner

*Primary Examiner* — Ryan Lepisto
*Assistant Examiner* — Mary El Shammaa
(74) *Attorney, Agent, or Firm* — Westerman, Hattori, Daniels & Adrian, LLP

(57) ABSTRACT

A multicore fiber includes a first multicore fiber member and a second multicore fiber member, one end face of the first multicore fiber member being spliced to one end face of the second multicore fiber member, wherein at least two core end faces of multiple cores in the first multicore fiber member are spliced one-to-one to core end faces of multiple cores in the second multicore fiber member, and, among the cores in the first multicore fiber member and the cores in the second multicore fiber member spliced one-to-one at the core end faces, at least one core in the first multicore fiber member and one core in the second multicore fiber member spliced thereto have different effective core areas, and an open end face of the core having the larger effective core area is a face which light enters.

10 Claims, 11 Drawing Sheets

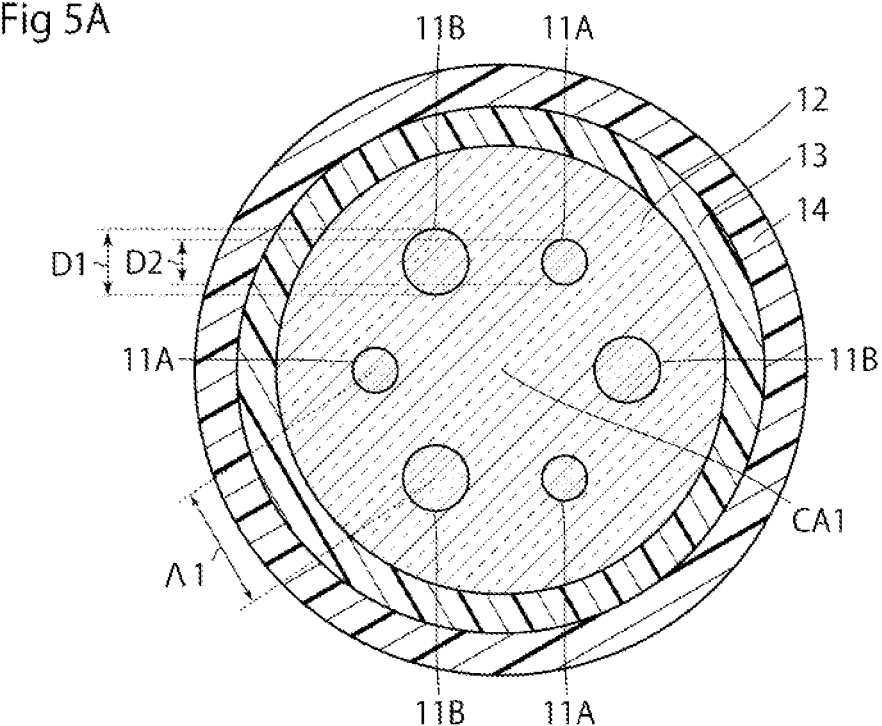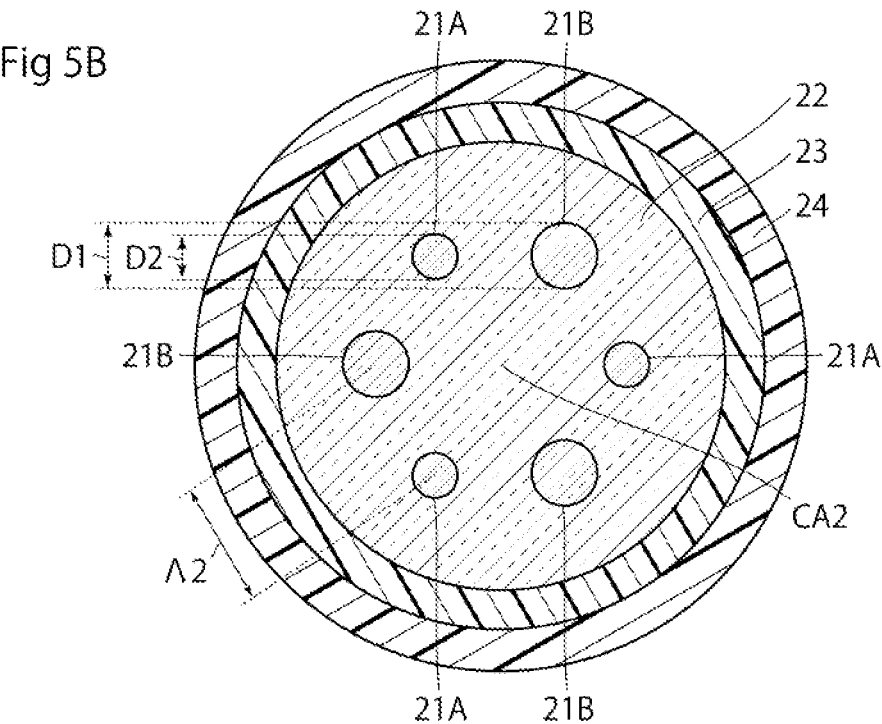

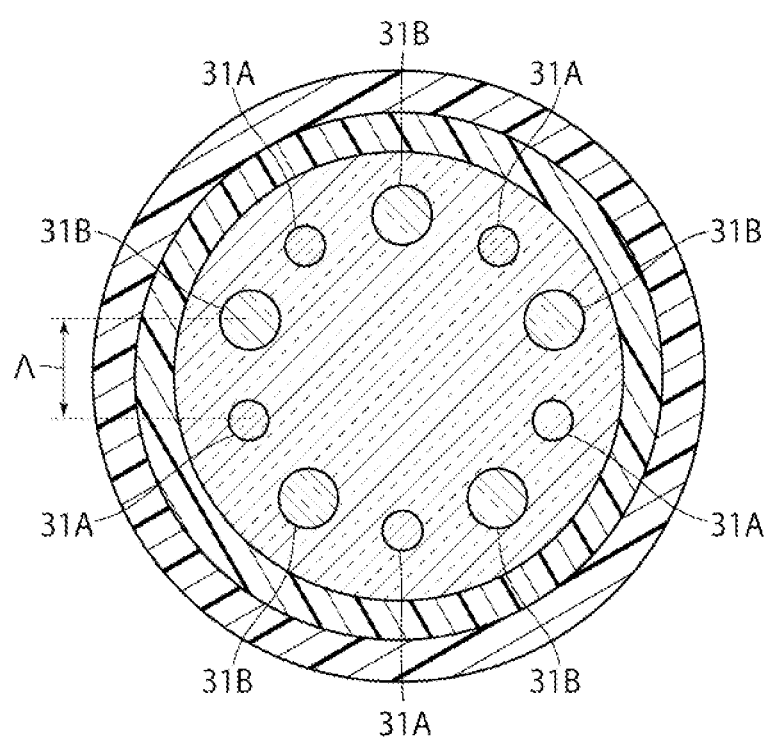

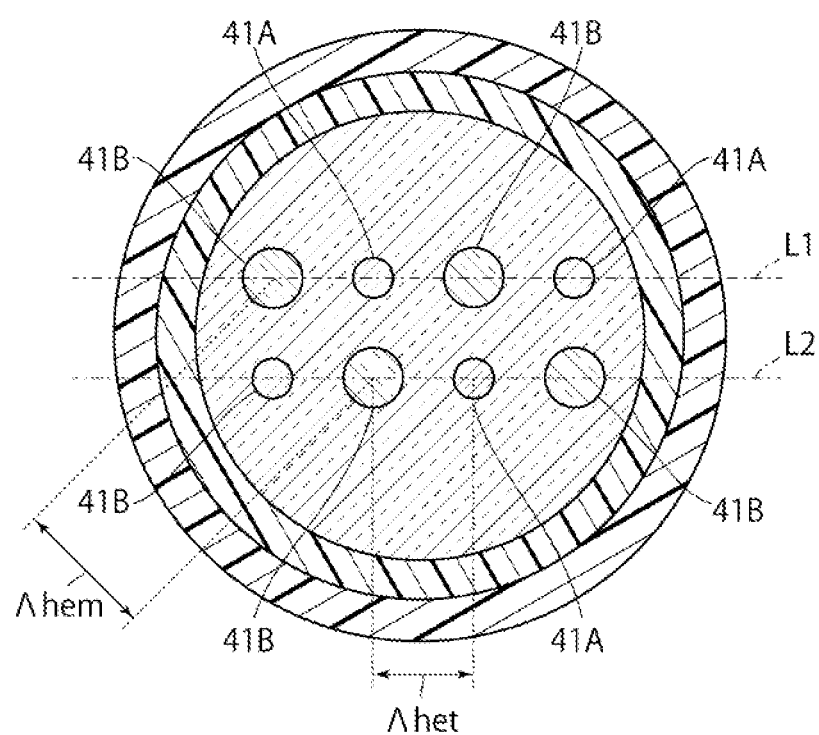

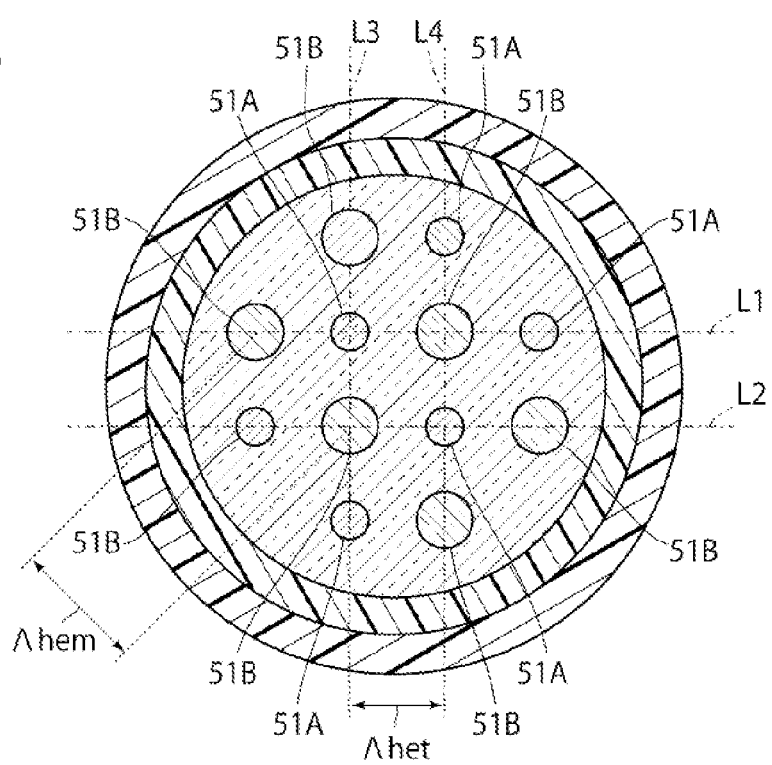

MULTICORE FIBER

BACKGROUND OF THE INVENTION

1. Field of the Invention

The present invention relates to a multicore fiber suitable for reducing the crosstalk.

2. Description of Related Art

It is known cores having a large effective core area in a multicore fiber increases crosstalk between the cores.

Document 1 to 3 propose multicore fibers having a hexagonal close-packed structure with an increased effective core area 110 μm² but with reduced crosstalk.

Document 1; Optics Express, Vol. 20, Issue 9, pp. 10100-10105 (2012)

Document 2; European Conference and Exhibition on Optical Communication (ECOC), Optical Society of America Washington, D.C. (2012), Mo. 1, F. 3

Document 3; European Conference and Exhibition on Optical Communication (ECOC), Optical Society of America Washington, D.C. (2012), Mo. 1, F. 2

SUMMARY OF THE INVENTION

The demands for reducing the crosstalk and increasing the effective core area have been increasing, and a multicore fiber with further reduced crosstalk and an increased effective core area is desired.

It is therefore an object of the present invention to provide a multicore fiber capable of further reducing the crosstalk and increasing the effective core area.

To achieve this object, the present invention provides a multicore fiber including a first multicore fiber member and a second multicore fiber member, one end face of the first multicore fiber member being spliced to one end face of the second multicore fiber member, wherein at least two core end faces of multiple cores in the first multicore fiber member are spliced one-to-one to core end faces of multiple cores in the second multicore fiber member, and among the cores in the first multicore fiber member and the cores in the second multicore fiber member spliced one-to-one at the core end faces, at least one core in the first multicore fiber member and one core in the second multicore fiber member spliced thereto have different effective core areas, and an open end face of the core having the larger effective core area is a face which light enters.

In such a multicore fiber, one of the first multicore fiber member and the second multicore fiber member spliced to each other at the core end faces that has the larger effective core area is the first part of a propagation path, and the other that has the smaller effective core area is the second part of the propagation path.

As a result, the crosstalk in the multicore fiber member having the cores that constitute the second part of the propagation path is reduced by an amount corresponding to the amount by which the effective core area of the cores in the second part of the propagation path is smaller than that of the cores in the first part of the propagation path, as compared to a case where the cores in the first part of the propagation path and the cores in the second part of the propagation path have substantially equal effective core areas.

Furthermore, the cores in the first part of the propagation path can be enlarged as compared to the case where the cores in the first part of the propagation path and the cores in the second part of the propagation path have substantially equal effective core areas while maintaining the crosstalk in this case.

A multicore fiber capable of further reducing the crosstalk and increasing the effective core area can thus be achieved.

Preferably, the cores in each of the first multicore fiber member and the cores in the second multicore fiber member include first cores and second cores having a larger effective core area than the first cores, and core end faces of the first cores in the first multicore fiber member and core end faces of the second cores in the second multicore fiber member are spliced one-to-one to one another, and core end faces of the second cores in the first multicore fiber member and core end faces of the first cores in the second multicore fiber member are spliced one-to-one to one another.

In this case, the first multicore fiber member and the second multicore fiber member include both cores having a large effective core area and cores having a small effective core area. As a result, it is possible to further reduce the crosstalk in the multicore fiber members as compared to the case in which one of the first multicore fiber member and the second multicore fiber member only includes the cores having a large effective core area and the other multicore fiber member only includes the cores having a small effective core area.

Preferably, the first cores and the second cores in the first multicore fiber member, and the first cores and the second cores in the second multicore fiber member are arranged adjacent to one another.

In this case, a first core and a second core adjacent to each other can have different propagation constants of propagation modes. Consequently, it is possible to further reduce the crosstalk between the first cores and the second cores as compared to a case in which the first cores and the second cores are not arranged adjacent to one another.

Preferably, a center axis of the first multicore fiber member and a center axis of the second multicore fiber member are aligned with each other, and the first cores and the second cores are arranged alternately around the center axes at equal core-to-core distances between the first cores and the second cores.

In this case, all of the first cores having the smaller effective core area and the second cores having the larger smaller effective core area in the first multicore fiber member and the second multicore fiber ember are arranged adjacent to one another. As a result, the crosstalk between the first cores and the second cores can further be reduced.

The core having the larger effective core area may be a core in the first multicore fiber member.

In this case, the core having the smaller effective core area is a core in the second multicore fiber member. As a result, the crosstalk between cores in the second multicore fiber member can be reduced as compared to a case where the effective core areas are substantially equal.

Preferably, a difference in the effective core area difference between a core in the first multicore fiber member and a core in the second multicore fiber member is 45 μm² or smaller.

In this case, the splice loss caused by the difference between the effective core area of the cores in the first multicore fiber member and that of the cores in the second multicore fiber member can be 0.3 dB or smaller as typically required in the field of optical fiber.

Preferably, a difference in the effective core area difference between a core in the first multicore fiber member and a core in the second multicore fiber member is 10 μm² or larger.

In this case, the crosstalk can certainly be reduced to such an extent that can be evaluated as producing a substantial effect.

A difference in refractive index between the core having the larger effective core area and a clad surrounding the core may be smaller than that between the core having the smaller effective core area and a clad surrounding the core, and the core having the larger effective core area may have a diameter substantially equal to that of the core having the smaller effective core area.

Alternatively, the core having the larger effective core area may have a diameter larger than that of the core having the smaller effective core area, and a difference in refractive index between the core having the larger effective core area and a clad surrounding the core may be substantially equal to that between the core having the smaller effective core area and a clad surrounding the core.

Alternatively, the core having the larger effective core area may have a diameter larger than that of the core having the smaller effective core area, and a difference in refractive index between the core having the larger effective core area and a clad surrounding the core may be smaller than that between the core having the smaller effective core area and a clad surrounding the core.

According to the present invention, a multicore fiber capable of further reducing the crosstalk and increasing the effective core area can thus be achieved.

BRIEF DESCRIPTION OF THE DRAWINGS

FIGS. 5A and 5B are views illustrating cross sections perpendicular to the longitudinal direction of the multicore fiber according to the second embodiment;

FIG. 6 is a view illustrating an example of a circular arrangement in which the number of cores is ten;

FIG. 7 is a view illustrating an example of a parallel arrangement in which the number of cores is eight;

FIG. 8 is a view illustrating an example of a parallel arrangement in which the number of cores is twelve;

DETAILED DESCRIPTION OF THE INVENTION

Embodiments of the present invention will be described in detail below with reference to the drawings.

(1) First Embodiment

Figure 1:
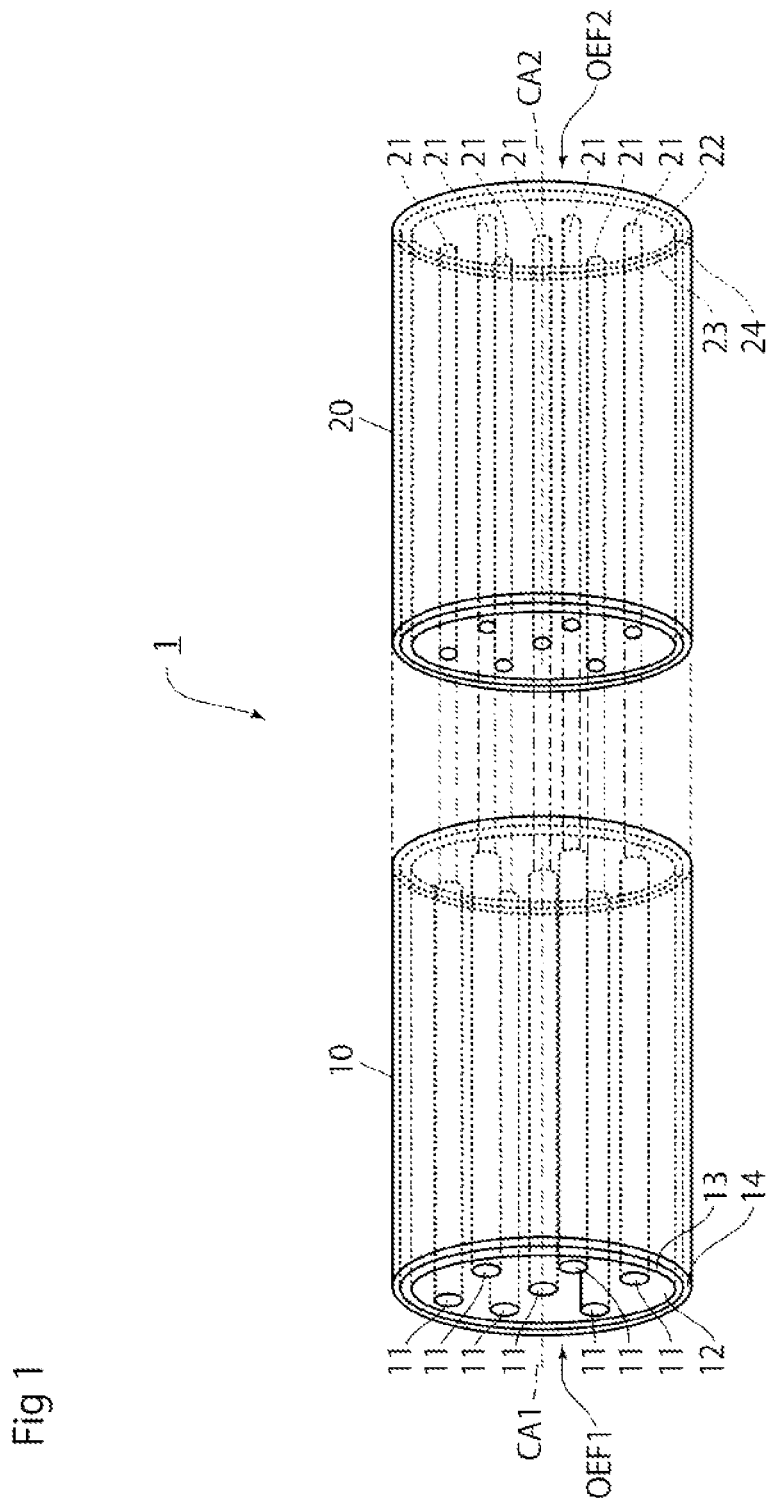
FIG. 1 is a view illustrating a multicore fiber according to a first embodiment.

FIG. 1 is a view illustrating a multicore fiber 1 according to a first embodiment. As illustrated in FIG. 1, the multicore fiber 1 according to the present embodiment includes a first multicore fiber member 10 and a second multicore fiber member 20 as components.

Figure 2A:
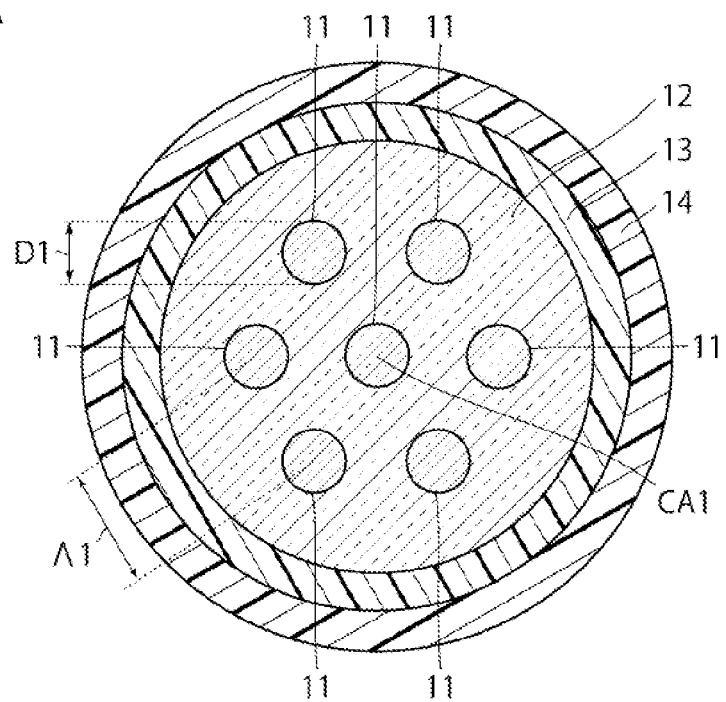
FIGS. 2A and 2B are views illustrating cross sections perpendicular to the longitudinal direction of the multicore fiber according to the first embodiment.
Figure 2B:
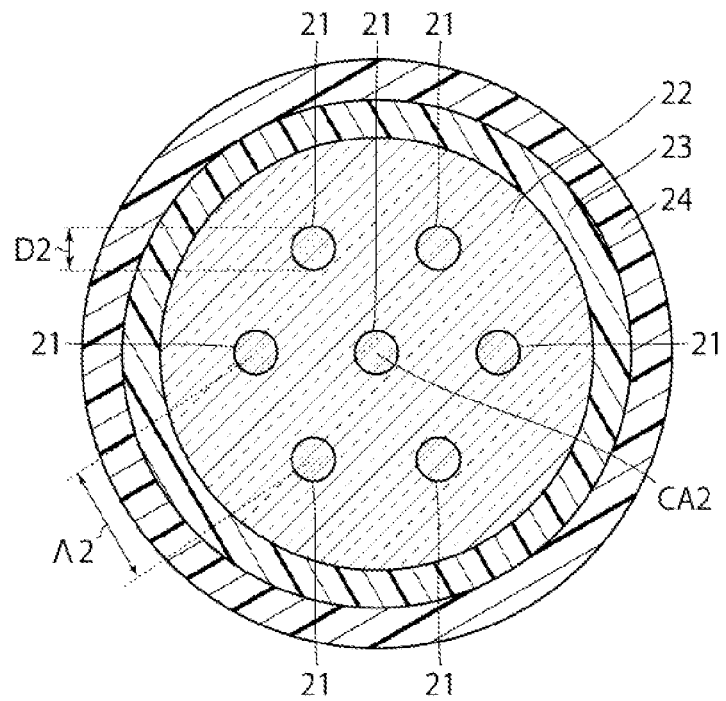

FIGS. 2A and 2B are views illustrating cross sections perpendicular to the longitudinal direction of the multicore fiber 1 according to the first embodiment. Specifically, FIG. 2A illustrates one end face of the first multicore fiber member 10 and FIG. 2B illustrates one end face of the second multicore fiber member 20.

As illustrated in FIG. 2A, the first multicore fiber member 10 includes multiple cores 11, a clad 12 surrounding the cores 11 without any gap, a first coating layer 13 surrounding the clad 12, and a second coating layer 14 surrounding the first coating layer 13 as main components.

The cores 11 have the same structure, and the core-to-core distances between adjacent cores (distances between center axes of adjacent cores) $\Lambda1$ are equal. Furthermore, the cores 11 have a refractive index higher than that of the clad 12.

The first multicore fiber member 10 according to the present embodiment has six cores 11 arranged around the center axis CA1 of the clad 12 and one core 11 arranged inside the six cores 11.

In a cross section perpendicular to the longitudinal direction of the first multicore fiber member 10, the centers of the six cores 11 correspond to vertices of a regular hexagon centered at the center of the clad 12 and the center of the core 11 inside of the six cores 11 corresponds to the center of the clad 12. Note that the center axis CA1 of the clad 12 is also the center axis of the first multicore fiber member 10.

As illustrated in FIG. 2B, the second multicore fiber member 20 includes multiple cores 21, a clad 22, a first coating layer 23, and a second coating layer 24 as main components similarly to the first multicore fiber member 10.

The cores 21 have the same structure, and a diameter D2 of the cores 21 is smaller than the diameter D1 of the cores 11 of the first multicore fiber member 10. The core-to-core distances $\Lambda2$ between adjacent cores are equal and also equal to the core-to-core distances $\Lambda1$ of the first multicore fiber member 10.

Similarly to the first multicore fiber member 10, the cores 21 have a refractive index higher than that of the clad 22. The difference in refractive index between the cores 21 and the clad 22 is substantially equal to the difference in refractive index between the cores 11 and the clad 12 of the first multicore fiber member 10.

Similarly to the first multicore fiber member 10, the second multicore fiber member 20 according to the present embodiment has six cores 21 arranged around the center axis CA2 of the clad 22 and one core 21 arranged inside the six cores 21.

In a cross section perpendicular to the longitudinal direction of the second multicore fiber member 20, the centers of the six cores 21 correspond to vertices of a regular hexagon centered at the center of the clad 22. The regular hexagon has a size equal to that in the first multicore fiber member 10 since the core-to-core distances $\Lambda2$ of the second multicore fiber member 20 are equal to the core-to-core distances $\Lambda1$ of the first multicore fiber member 10. Furthermore, in the cross section perpendicular to the longitudinal direction of the second multicore fiber member 20, the center of the core 21 inside of the six cores 21 corresponds to the center of the clad 22 similarly to the first multicore fiber member 10. Note that the center axis CA2 of the clad 22 is also the center axis of the second multicore fiber member 20.

The end faces of the first multicore fiber member 10 and the second multicore fiber member 20 described above are spliced by fusion splicing, and the end faces of the respective cores of the first multicore fiber member 10 are spliced one-to-one to the end faces of the respective cores of the second multicore fiber member 20. The center axes of the cores 11 of the first multicore fiber member 10 also correspond to the center axes of the cores 21 of the second multicore fiber member 20.

As described above, the diameter D1 of the cores 11 of the first multicore fiber member 10 is larger than the diameter D2 of the cores 21 of the second multicore fiber member 20, and the difference in refractive index between the cores 11 and the clad 12 is substantially equal to the difference in refractive index between the cores 21 and the clad 22. Thus, the effective core area of the cores 11 is larger than that of the cores 21. When the effective core area is represented by $A_{eff}$ and the mode field diameter is represented by MFD, the effective core area $A_{eff}$ is expressed by the following equation (1):

$$A_{eff} = k \frac{\pi}{4} (MFD)^2 \qquad (1)$$

In the equation (1), k is a constant.

The difference between the effective core area of the cores 11 and that of the cores 21 is within a range from 10 $\mu m^2$ to 45 $\mu m^2$.

The core end faces of the cores 11 in the open end face OEF 1 of the first multicore fiber member 10 that have a larger effective core area are faces which light enters, and the core end faces of the cores 21 in the open end face OEF 2 of the second multicore fiber member 20 that have a smaller effective core area are faces through which light exits.

With the multicore fiber 1 according to the present embodiment, light entering the core end faces in the open end face OEF 1 of the first multicore fiber member 10 is transmitted through the cores 11 and then transmitted through the cores 21. The light transmitted through the cores 21 then exits through the core end faces in the open end face OEF 2 of the second multicore fiber member 20.

In the present embodiment, of the cores 11 of the first multicore fiber member 10 and the cores 21 of the second multicore fiber member 20 whose core end faces are spliced to one another, the cores 11 having the larger effective core area constitute a first part of a propagation path whereas the cores 21 having the smaller effective core area constitute a second part of the propagation path.

As a result, the crosstalk in the second multicore fiber member 20 having the cores 21 that constitute the second part of the propagation path is reduced by an amount corresponding to the amount by which the effective core area of the cores 21 in the second part of the propagation path is smaller than that of the cores 11 in the first part of the propagation path, as compared to a case where the cores 11 in the first part of the propagation path and the cores 21 in the second part of the propagation path have substantially equal effective core areas.

Furthermore, the cores 11 in the first part of the propagation path can be enlarged as compared to the case where the cores 11 in the first part of the propagation path and the cores 21 in the second part of the propagation path have substantially equal effective core areas while maintaining the crosstalk in this case. The multicore fiber 1 with reduced crosstalk and an increased effective core area is thus achieved.

Note that the light attenuation in the cores 21 in the second part of the propagation path is higher than that in the cores 11 in the first part of the propagation path. It is thus possible to suppress substantial signal degradation due to nonlinear effects in the cores 21 in the second part of the propagation path even when the cores 21 in the second part of the propagation path have a smaller effective core area than the cores 11 in the first part of the propagation path. Consequently, it is also possible to increase the length of the multicore fiber 1 while reducing the crosstalk.

The difference in effective core area between the cores 11 in the first part of the propagation path and the cores 21 in the second part of the propagation path whose core end faces are spliced to one another causes not a little splice loss between the cores 11 in the first part of the propagation path and the cores 21 in the second part of the propagation path.

When the splice loss is represented by a, the mode field diameter of the cores 11 is represented by $MFD_2$, and the mode field diameter of the cores 21 is represented by $MFD_2$, the splice loss a is expressed by the following equation (2):

$$a = -10 \log \left( \frac{2 \frac{MFD_1}{2} \frac{MFD_2}{2}}{\left(\frac{MFD_1}{2}\right)^2 + \left(\frac{MFD_2}{2}\right)^2} \right) \qquad (2)$$

Figure 3:
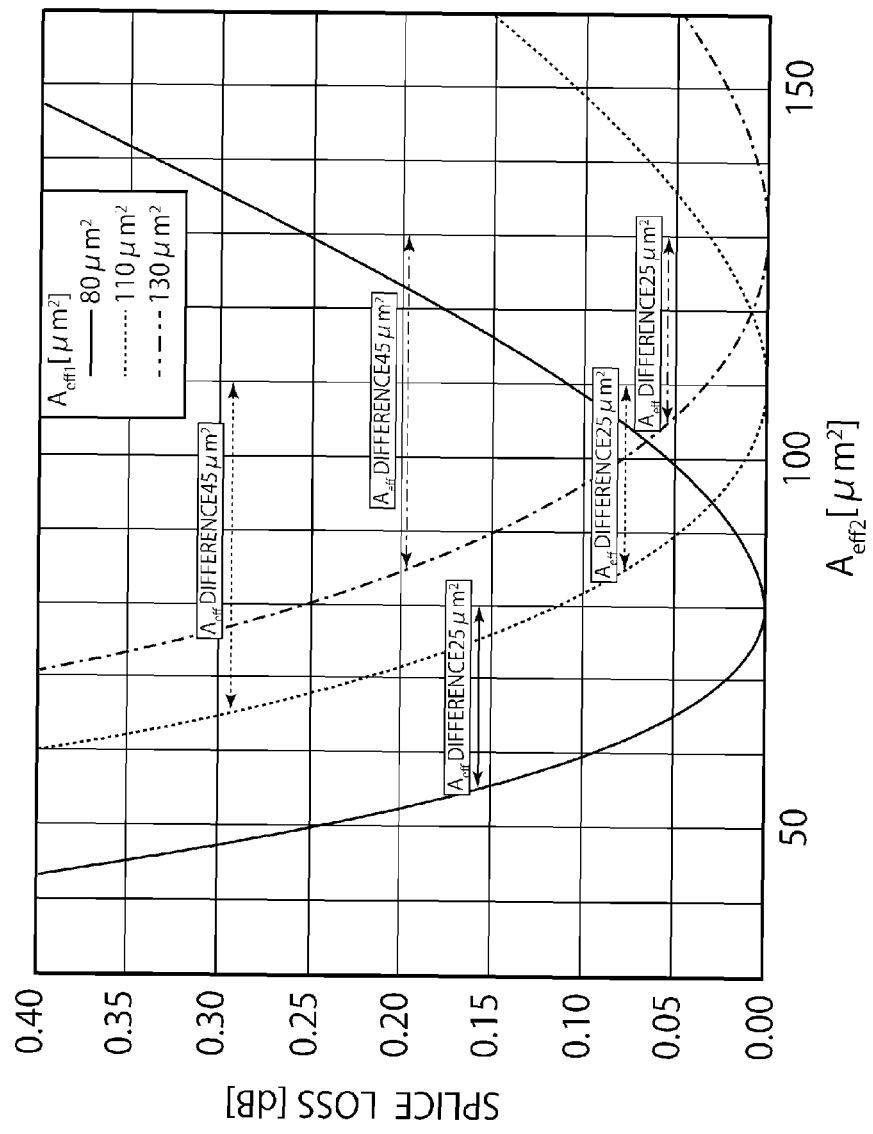
FIG. 3 is a graph illustrating the relation between the difference in effective core area and the splice loss.

The relation between the difference in effective core area and the splice loss is shown in FIG. 3. The graph of FIG. 3 shows results of calculating the variations of the splice loss when the effective core area $A_{eff1}$ of the cores 11 in the first part of the propagation path is fixed and the effective core area $A_{eff2}$ of the cores 21 in the second part of the propagation path is changed by using the equations (1) and (2). In the equation (1), the constant k is 1.

As shown in FIG. 3, the splice loss is larger as the difference in effective core area between the cores 11 in the first part of the propagation path and the cores 21 in the second part of the propagation path is larger.

In the present embodiment, the difference between the effective core area of the cores 11 of the first multicore fiber member 10 and that of the cores 21 of the second multicore fiber member 20 is 45 $\mu m^2$ or smaller.

In such a relation, as can be seen in FIG. 3, the splice loss caused by the difference between the effective core area of the cores 11 in the first part of the propagation path and that of the cores 21 in the second part of the propagation path can be 0.3 dB or smaller as typically required in the field of optical fiber.

In FIG. 3, the splice loss is larger than 0.3 when the effective core area $A_{eff1}$ of the cores 11 is 80 $\mu m^2$ and the effective core area $A_{eff2}$ of the cores 21 is smaller than 47 $\mu m^2$. However, the minimum effective core area required for long distance transmission is approximately 50 $\mu m^2$, and the splice loss when the effective core area $A_{eff1}$ of the cores 11 is 80 $\mu m^2$ and the effective core area $A_{eff2}$ of the cores 21 is 50 $\mu m$ is 0.3 or smaller.

Furthermore, in the present embodiment, the difference between the effective core area of the cores 11 of the first multicore fiber member 10 and that of the cores 21 of the second multicore fiber member 20 is 10 $\mu m^2$ or larger.

In such a range, the crosstalk can certainly be reduced to such an extent that can be evaluated as producing a substantial effect.

In particular, when the difference between the effective core area of the cores 11 of the first multicore fiber member 10 and that of the cores 21 of the second multicore fiber member 20 is within a range from 10 $\mu m^2$ to 25 $\mu m^2$, the splice loss caused by the difference can be reduced to 0.3 dB or smaller even if an excess loss is caused by deviation in the core arrangement or misalignment.

(2) Second Embodiment

Next, a second embodiment will be described in detail with reference to the drawings. Here, components that are identical or similar to those in the first embodiment are designated by the same reference numerals and redundant description will not be repeated unless otherwise particularly described.

Figure 4:
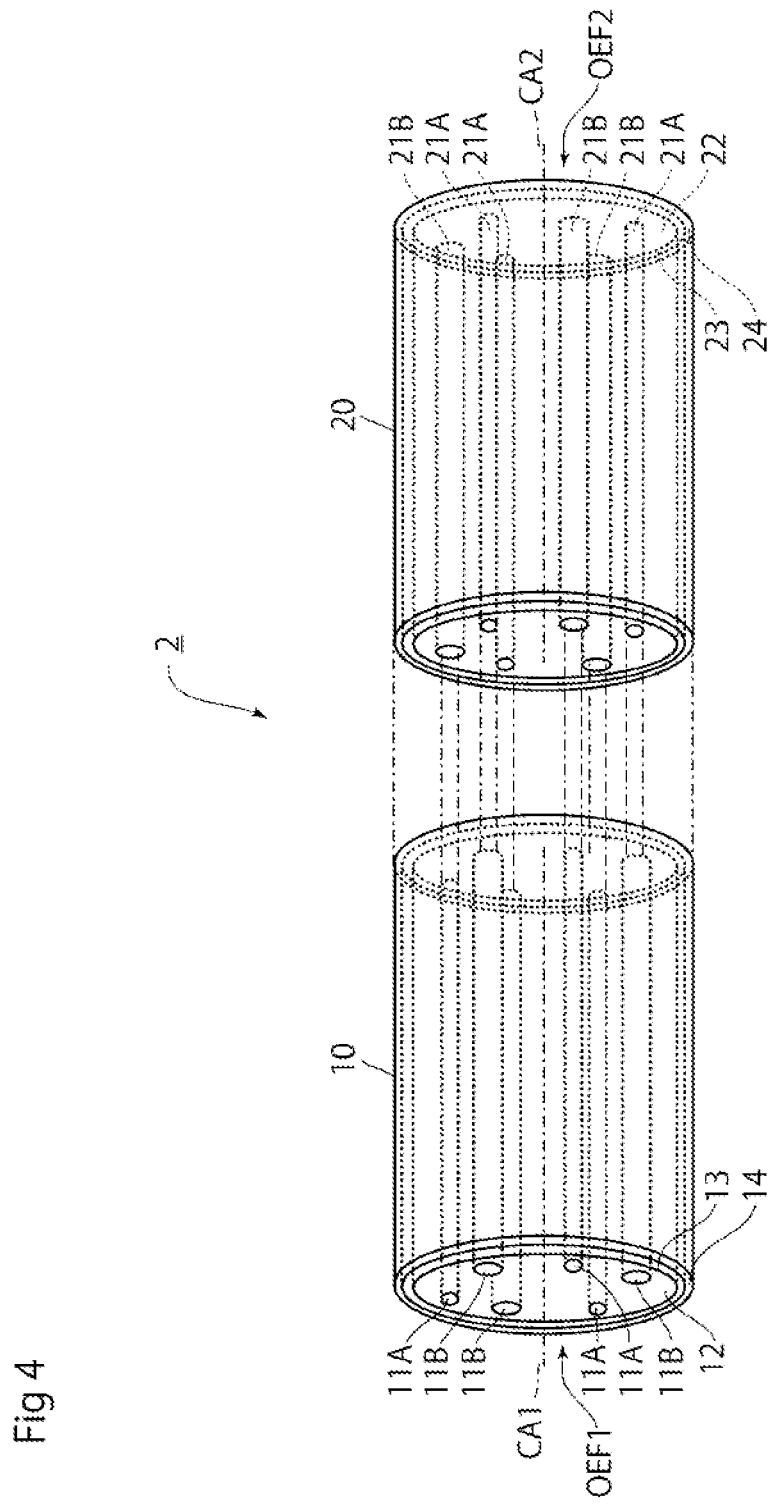
FIG. 4 is a view illustrating a multicore fiber according to a second embodiment.

FIG. 4 is a view illustrating a multicore fiber 2 according to the second embodiment. FIGS. 5A and 5B are views illustrating cross sections perpendicular to the longitudinal direction of the multicore fiber 2 according to the second embodiment. Specifically, FIG. 5A illustrates one end face of a first multicore fiber member 10 and FIG. 5B illustrates one end face of a second multicore fiber member 20.

As illustrated in FIGS. 4 and 5, the multicore fiber 2 according to the present embodiment is different from the multicore fiber 1 according to the first embodiment in that the multicore fiber 2 has a core structure different from that of the first embodiment.

Specifically, the first multicore fiber member 10 according to the first embodiment has six cores 11 arranged around the center axis CA1 of the clad 12 and one core 11 arranged inside the six cores 11. Similarly, the second multicore fiber member 20 according to the first embodiment has six cores 21 arranged around the center axis CA2 of the clad 22 and one core 21 arranged inside the six cores 21.

In contrast, the first multicore fiber member 10 according to the present embodiment has six cores 11 arranged around the center axis CA1 of the clad 12 but has no core arranged inside the six cores 11. Similarly, the second multicore fiber member 20 has six cores 21 arranged around the center axis CA2 of the clad 22 but has no core arranged inside the six cores 21.

Furthermore, in the first embodiment, the cores 11 of the first multicore fiber member 10 are cores of the same type having equal effective core areas, and the cores 21 of the second multicore fiber member 20 are cores of the same type having equal effective core areas.

In contrast, in the present embodiment, the cores 11 of the first multicore fiber member 10 and the cores 21 of the second multicore fiber member 20 both include two types of cores having different effective core areas.

Specifically, the first multicore fiber member 10 includes first cores 11A and second cores 11B having a larger effective core areas than the first cores 11A. Similarly, the second multicore fiber member 20 includes first cores 21A and second cores 21B having a larger effective core areas than the first cores 21A.

The first cores 11A and the second cores 11B of the first multicore fiber member 10 are arranged alternately around the center axis CA1 of the first multicore fiber member 10. The core-to-core distances between the first cores 11A and the second cores 11B are equal to the core-to-core distances Λ1 in the first embodiment.

The first cores 21A and the second cores 21B of the second multicore fiber member 20 are arranged alternately around the center axis CA2 of the first multicore fiber member 20. The core-to-core distances between the first cores 21A and the second cores 21B are equal to the core-to-core distances Λ2 in the first embodiment.

Core end faces of the first cores 11A of the first multicore fiber member 10 and the second cores 21B of the second multicore fiber member 20 are spliced one-to-one to one another, and core end faces of the second cores 11B of the first multicore fiber member 10 and the first cores 21A of the second multicore fiber member 20 are spliced one-to-one to one another.

The center axes of the cores 11A and 21B and those of the cores 11B and 21A whose core end faces are spliced are aligned with each other, and the center axis CA1 of the first multicore fiber member 10 and the center axis CA2 of the second multicore fiber member 20 are aligned with each other.

The open end face OEF1 of the second cores 11B and 21B having a larger effective core area is a face which light enters, and the open end face OEF2 of the first cores 11A and 21A having a smaller effective core area is a face through which light exits. Thus, while light travels unidirectionally from one end to the other of the multicore fiber 1 in the first embodiment, light travels bidirectionally from one end to the other of the multicore fiber 2 and in the opposite direction in the present embodiment.

The diameter of the second cores 11B and 21B having the larger effective core area is equal to the diameter D1 of the cores 11 of the first embodiment, and the diameter of the first cores 11A and 21A having the smaller effective core area is equal to the diameter D2 of the cores 21 of the first embodiment.

Furthermore, the difference in refractive index between the second cores 11B having the larger effective core area and the clad 12 and that between the second cores 21B and the clad 22 is substantially equal to the difference in refractive index between the first cores 11A having the smaller effective core area and the clad 12 and that between the first cores 21A and the clad 22.

The multicore fiber 2 according to the present embodiment includes the first cores 11A, 21A having the smaller effective core area and the second cores 11B, 21B having the larger effective core area in both of the first multicore fiber member 10 and the second multicore fiber member 20.

It is thus possible to further reduce the crosstalk in the first multicore fiber member 10 as compared to the first embodiment in which the first multicore fiber member 10 only includes the cores 11 having a large effective core area and the second multicore fiber member 20 only includes the cores 21 having a small effective core area.

Furthermore, in the present embodiment, the first cores 11A and the second cores 11B of the first multicore fiber member 10 are arranged alternately around the center axis CA1 of the first multicore fiber member 10.

All of the first cores 11A having the smaller effective core area and the second cores 11B having the larger effective core area in the first multicore fiber member 10 are thus arranged adjacent to one another. Consequently, the first cores 11A and the second cores 11B can have different propagation constants of propagation modes, and as a result, the crosstalk can further be reduced as compared to a case in which the first cores 11A and the second cores 11B are not alternately arranged.

The crosstalk can also be further reduced with the first cores 21A having the smaller effective core area and the second cores 21B having the larger effective core area in the second multicore fiber member 20 similarly to the first multicore fiber member 10.

(3) Modified Examples

Although the present invention has been described above by reference to the first and second embodiments as examples, the invention is not limited thereto.

For example, the core end faces of the cores 11 of the first multicore fiber member 10 and those of the cores 21 of the second multicore fiber member 20 are spliced by fusion splicing. Any splicing method other than fusion splicing may, however, be used as long as the core end faces of the first multicore fiber member 10 and the second multicore fiber member 20 are optically coupled in contact with one another.

Furthermore, in the first embodiment, the effective core area of all the cores 11 of the multicore fiber member 10 and that of all the cores 21 of the second multicore fiber member 20 whose core end faces are spliced to one another are different from each other.

In the second embodiment, the effective core area of all the first cores 11A of the first multicore fiber member 10 and that of all the second cores 21B of the second multicore fiber member 20 whose core end faces are spliced to one another are different from each other, and the effective core area of all the second cores 11B of the first multicore fiber member 10 and that of all the first cores 21A of the second multicore fiber member 20 whose core end faces are spliced to one another are different from each other.

However, some of multiple cores of the first multicore fiber member 10 and some of multiple cores of the second multicore fiber member 20 whose core end faces are spliced one-to-one to one another may have equal effective core areas.

In other words, if at least one of multiple cores of the first multicore fiber member 10 and at least one of multiple cores of the second multicore fiber member 20 whose core end faces are spliced one-to-one to one another may have different effective core areas, the same effects as those in the embodiments described above can be produced for the cores.

Furthermore, in the first embodiment, the center axes of the cores 11 of the first multicore fiber member 10 and those of the cores 21 of the second multicore fiber member 20 whose core end faces are spliced to one another are aligned with one another.

In the second embodiment, the center axes of the first cores 11A or the second cores 11B of the first multicore fiber member 10 and those of the second cores 21B or the first cores 21A of the second multicore fiber member 20 whose core end faces are spliced to one another are aligned with one another.

The center axes of the cores, however, need not necessarily be aligned with one another as long as the misalignment between a center axis of a core having a larger effective core area and that of a core having a smaller effective core area is within a given range.

Furthermore, in the first embodiment, the diameter D1 of the cores 11 is larger than the diameter D2 of the cores 21, and the difference in refractive index between the cores 11 and the clad 12 is substantially equal to the difference in refractive index between the cores 21 and the clad 22, so that the effective core area of the cores 11 and that of the cores 21 are different from each other.

In the second embodiment, the diameter D1 of the second cores 11B or 21B is larger than the diameter D2 of the first cores 11A or 21A, and the difference in refractive index between the second cores 11B and the clad 12 and that between the second cores 21B and the clad 22 are substantially equal to that between the first cores 11A and the clad 12 and that between the first cores 21A and the clad 22, so that the effective core area of the second cores 11B or 21B and that of the first cores 11A or 21A are different from each other.

The technique for making the effective core areas different is not limited to those in the embodiments described above. For example, the diameter of cores having a larger effective core area and the diameter of cores having a smaller effective core area may be substantially equal, and the difference in refractive index between the cores having the larger effective core area and the clad surrounding the cores may be smaller than that between the cores having the smaller effective core area and the clad surrounding the cores.

Alternatively, the diameter of cores having a larger effective core area may be larger than the diameter of cores having a smaller effective core area, and the difference in refractive index between the cores having the larger effective core area and the clad surrounding the cores may be smaller than that between the cores having the smaller effective core area and the clad surrounding the cores. In such cases, the difference between the effective core areas can be made larger than when either one of the difference in diameter and the difference in refractive index is used, and the crosstalk can thus be further reduced.

Furthermore, the number of cores in each of the first multicore fiber member 10 and the second multicore fiber member 20 is seven in the first embodiment, and six in the second embodiment. However, the number of cores in each of the first multicore fiber member 10 and the second multicore fiber 20 may be a number other than seven or six as long as the number is not less than two.

Furthermore, the core arrangement in the first multicore fiber member 10 and the second multicore fiber member 20 is a hexagonal close-packed arrangement in the first embodiment, and a circular arrangement in the second embodiment.

However, various arrangements other than the hexagonal close-packed arrangement and the circular arrangement may be applied to the core arrangement in the first multicore fiber member 10 and the second multicore fiber member 20.

Note that, in terms of arranging cores at equal core-to-core distances, examples of preferable arrangements include a close-packed arrangement in which cores are arranged on the center axis of the clad and on the vertices of a regular polygon centered at the center axis in a cross section perpendicular to the longitudinal direction of the multicore fiber, a circular arrangement in which cores are arranged at equal core-to-core distances around the center axis of the clad in the cross-section, and a parallel arrangement in which cores are arranged on lines at equal distance from a line passing through the center axis of the clad and parallel to one another so that the core-to-core distances are equal in the cross section. In the close-packed arrangement, the core-to-core distances between the core arranged on the center axis of the clad and the cores arranged on the vertices of the regular polygon may be equal to or different from the core-to-core distances between adjacent cores arranged on the vertices of the regular polygon.

In the second embodiment, the cores of the first multicore fiber member 10 include two types of cores 11A and 11B having different effective core areas, and the cores of the second multicore fiber member 20 include two types of cores 21A and 21B having different effective core areas.

However, cores of each of the first multicore fiber member 10 and the second multicore fiber member 20 may include three or more types of cores having different effective core areas.

In terms of arranging the cores at equal core-to-core distances, the cores of each of the first multicore fiber member 10 and the second multicore fiber member 20 preferably include two types of cores having different effective core areas.

Furthermore, for arranging the two types of cores having different effective core areas at equal core-to-core distances, the circular arrangement or the parallel arrangement is preferable. Examples of core arrangement of two types of cores having different effective core areas will be presented below. FIG. 6 illustrates an example of the circular arrangement in which the number of cores is ten, FIG. 7 illustrates an example of the parallel arrangement in which the number of cores is eight, and FIG. 8 illustrates an example of the parallel arrangement in which the number of cores is twelve.

As illustrated in FIG. 6, the ten cores include five first cores 31A having a small effective core area and five second cores 31B having a large effective core area. These first cores 31A and second cores 31B are arranged alternately around the center axis of a clad 32, and the core-to-core distances Λ between the cores are equal.

Alternatively, as illustrated in FIG. 7, the eight cores include four first cores 41A having a small effective core area and four second cores 41B having a large effective core area. These first cores 41A and second cores 41B are arranged alternately on a pair of lines L1 and L2 parallel to a line passing through the center of a clad 42 and at equal distances from the line on opposite sides thereof. The number of first cores 41A and second cores 41B arranged alternately on one line L1 is equal to the number of first cores 41A and second cores 41B arranged alternately on the other line L2. Furthermore, the core-to-core distances Λhet between the first cores 41A and the second cores 41B arranged alternately on each of the lines L1 and L2 are equal, and the core-to-core distances Λhet are smaller than the core-to-core distance Λhem between adjacent first cores 41A and between adjacent second core 41B on one line L1 and the other line L2.

Alternatively, as illustrated in FIG. 8, the twelve cores include six first cores 51A having a small effective area and six second cores 51B having a large effective core area. These first cores 51A and second cores 51B are arranged alternately on a pair of lines L1 and L2 parallel to a line passing through the center of a clad 52 and at equal distances from the line on opposite sides thereof and on a pair of lines L3 and L4 parallel to a line perpendicular to the line passing through the center and at equal distances from the perpendicular line on opposite sides thereof. The number of cores arranged alternately on one line L1 or L3 is equal to the number of cores arranged alternately on the other line L2 or L4, the core-to-core distances Λhet on each of the lines L1 to L4 are equal, and the core-to-core distances Λhet are smaller than the core-to-core distances Λhem.

Such a circular arrangement or parallel arrangement of two types of cores having different effective core areas in which the number of cores is an even number allows all of the first cores and the second cores of the first multicore fiber member 10 and the first cores and the second cores of the second multicore fiber member 20 to be arranged adjacent to one another. Consequently, the crosstalk can further be reduced as compared to the case in which the first cores and the second cores have equal effective core areas.

Note that, even if all of the first cores and the second cores are not arranged alternately, the crosstalk between cores can further be reduced by using different propagation constants of propagation modes for the first cores and the second cores as long as there are a first core and a second core arranged adjacent to each other.

The components in the multicore fibers 1 and 2 described above can be combined, omitted, modified or used with additional related technologies as necessary without departing from objects of the present application in addition to those described in the embodiments and the modified examples.

EXAMPLES

The present invention will be more concretely explained below with reference to examples and a comparative example, but the invention is not limited thereto.

Example 1

Figure 9A:
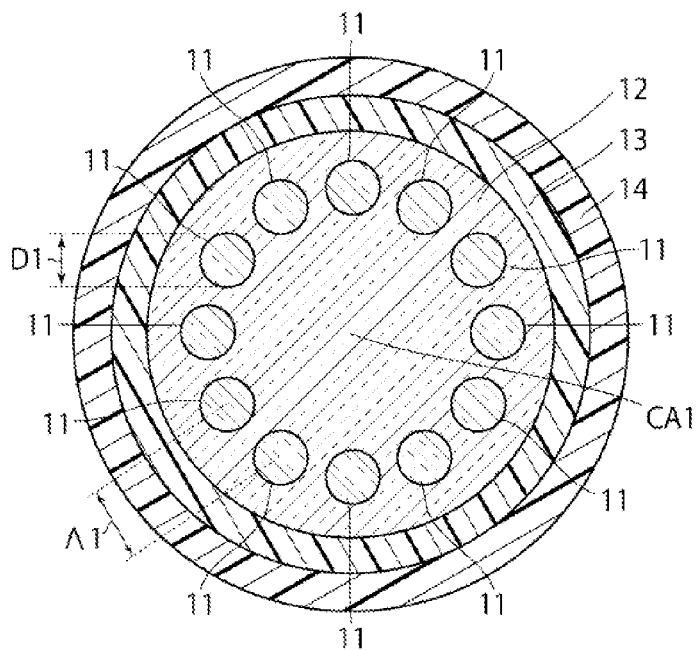
FIGS. 9A and 9B are views illustrating cross sections perpendicular to the longitudinal direction of a multicore fiber according to Example 1.
Figure 9B:
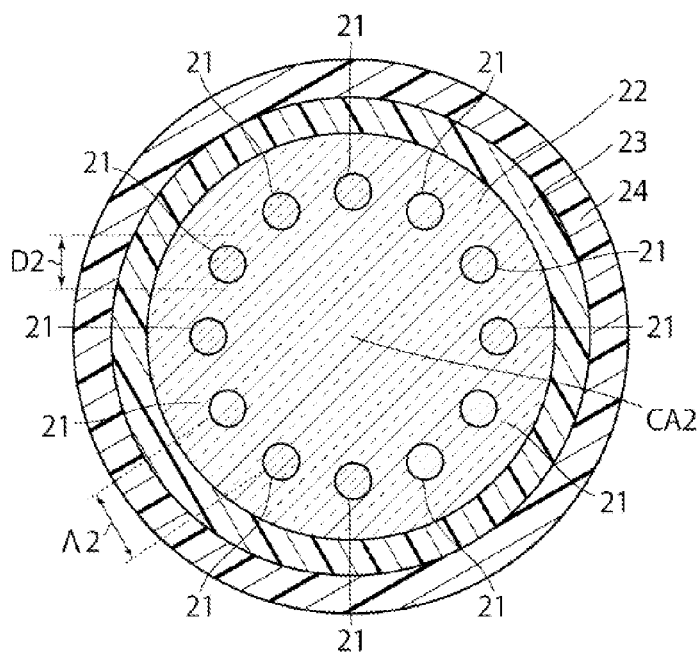

A multicore fiber that is a trial product for the multicore fiber 1 according to the first embodiment was produced. This multicore fiber is illustrated in FIGS. 9A and 9B. FIG. 9A illustrates the first multicore fiber member 10, and FIG. 9B illustrates the second multicore fiber member 20.

As illustrated in FIG. 9A, the first multicore fiber member 10 includes twelve cores 11 arranged at equal intervals around the center axis CA1 of the clad 12. The cores 11 have a diameter D1 of 11.1 μm, a relative refractive index difference of 0.29% with respect to the clad 12, and a core-to-core distance Λ1 therebetween of 40 μm. Furthermore, the first multicore fiber member 10 has a fiber length of 22 km. The cores 11 have a cutoff wavelength of 1,450 μm and an effective core area of 110 μm².

On the other hand, the second multicore fiber member 20 includes twelve cores 21 arranged around the center axis CA2 of the clad 22. The cores 21 have a diameter D2 of 9.38 μm, a relative refractive index difference of 0.39% with respect to the clad 22, and a core-to-core distance Λ2 therebetween of 40 μm. Furthermore, the second multicore fiber member 20 has a fiber length of 58 km. The cores 21 have a cutoff wavelength of 1,450 μm and an effective core area of 80 μm.

The first multicore fiber member 10 having a length of 22 km and the second multicore fiber member 20 having a length of 58 km were fusion spliced to form a span of fusion spliced first multicore fiber member 10 and second multicore fiber member 20. Furthermore, a number of such spans were combined to form a longer transmission line.

Comparative Example 1

A transmission line combining a number of spans, each of which is made of a multicore fiber of 80 km having the same structure as the first multicore fiber member 10 of Example 1, was provided.

<Crosstalk Measurement on Example 1 and Comparative Example 1>

Light in the 1,550 nm band was caused to enter the core end faces of the first multicore fiber member 10 of the multicore fiber according to Example 1 in a state in which the multicore fiber was wound at a radius of 300 mm, and the crosstalk was measured. The crosstalk at a 1,000 km point from the light entrance end faces was approximately −33 dB.

Light in the 1,550 nm band was also caused to enter the core end faces on one side of the first multicore fiber according to Comparative Example 1 in a state in which the multicore fiber was wound at a radius of 300 mm, and the crosstalk was measured. The crosstalk at a 1,000 km point from the light entrance end faces was approximately −18 dB.

The results show that it is possible to make the fiber length longer while reducing the crosstalk in Example 1 as compared to Comparative example 1 as described in the first embodiment.

Example 2

Figure 10A:
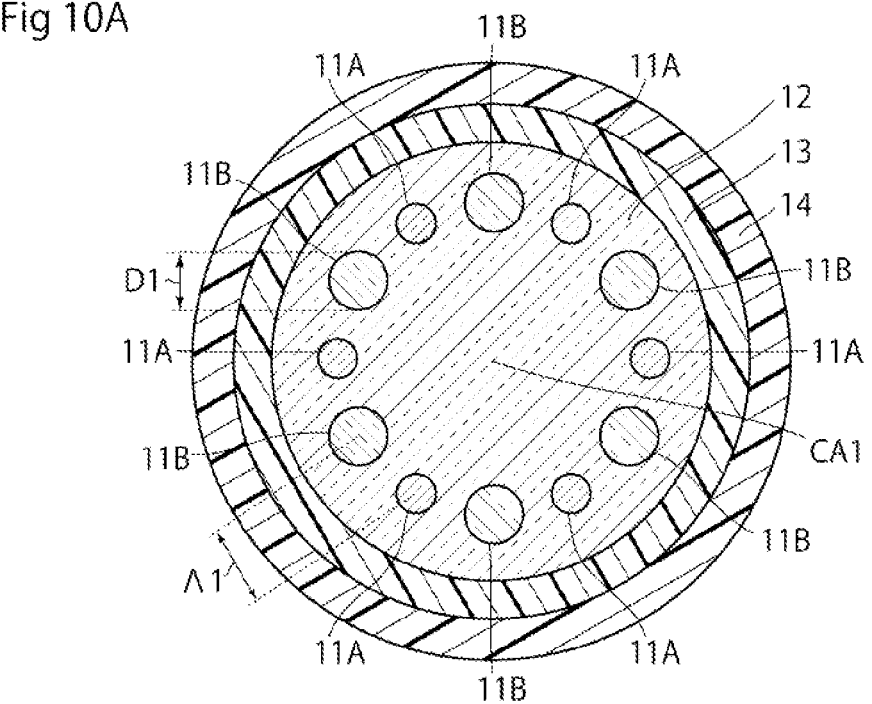
FIGS. 10A and 10B are views illustrating cross sections perpendicular to the longitudinal direction of a multicore fiber according to Example 2.
Figure 10B:
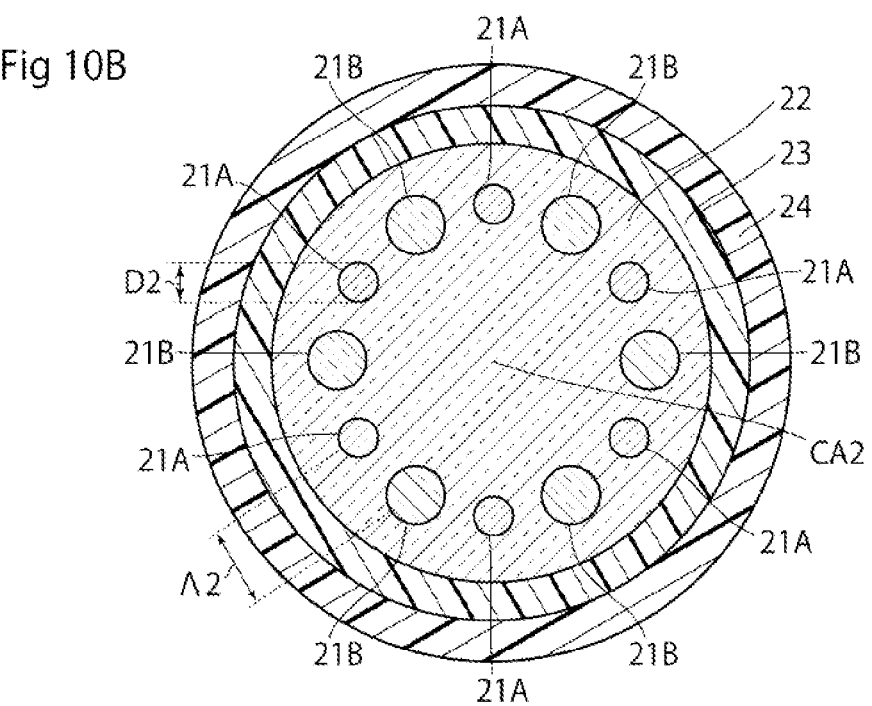

A multicore fiber that is a trial product for the multicore fiber 2 according to the second embodiment was produced. This multicore fiber is illustrated in FIGS. 10A and 10B. FIG. 10A illustrates the first multicore fiber member 10, and FIG. 10B illustrates the second multicore fiber member 20.

As illustrated in FIG. 10A, the first multicore fiber member 10 includes six first cores 11A and six second cores 11B arranged alternately at equal intervals around the center axis CA1 of the clad 12. The first cores 11A are the same as the cores 21 in Example 1, the second cores 11B are the same as the cores 11 in Example 1, and the core-to-core distances Λ1 between the first cores 11A and the second cores 11B are 40 μm. The first cores 11A and the second cores 11B have a cutoff wavelength of 1,450 μm, the first cores 11A have an effective core area of 80 μm², and the second cores 11B have an effective core area of 110 μm². Furthermore, the first multicore fiber member 10 has a fiber length of 40 km.

As illustrated in FIG. 10B, the second multicore fiber member 20 includes six first cores 21A and six second cores 21B arranged alternately at equal intervals around the center axis CA2 of the clad 22. The first cores 21A are the same as the cores 21 in Example 1, the second cores 21B are the same as the cores 11 in Example 1, and the core-to-core distances A2 between the first cores 21A and the second cores 21B are 40 μm. The first cores 21A and the second cores 21B have a cutoff wavelength of 1,450 μm², the first cores 21A have an effective core area of 80 μm, and the second cores 21B have an effective core area of 110 μm². Furthermore, the second multicore fiber member 20 has a fiber length of 40 km.

Core end faces of the first cores 11A of the first multicore fiber member 10 and the second cores 21B of the second multicore fiber member 20 were fusion spliced one-to-one to one another, and core end faces of the second cores 11B of the first multicore fiber member 10 and the first cores 21A of the second multicore fiber member 20 were fusion spliced one-to-one to one another to form a span of 80 km. A number of such spans were combined to form a transmission line.

<Crosstalk Measurement on Example 2>

Light in the 1,550 nm band was caused to enter the open end faces of the second cores 21B of the multicore fiber according to Example 2 in a state in which the multicore fiber was wound at a radius of 300 mm, and the crosstalk was measured. The crosstalk at a 1,000 km point from the light entrance end faces was approximately −58 dB.

The comparison with the crosstalk in Example 1 shows that the crosstalk is significantly reduced in Example 2 compared to Example 1. Thus, as described in the second embodiment, the result shows that Example 2 corresponding to the second embodiment can further reduce the crosstalk than Example 1 corresponding to the first embodiment.

Figure 11:
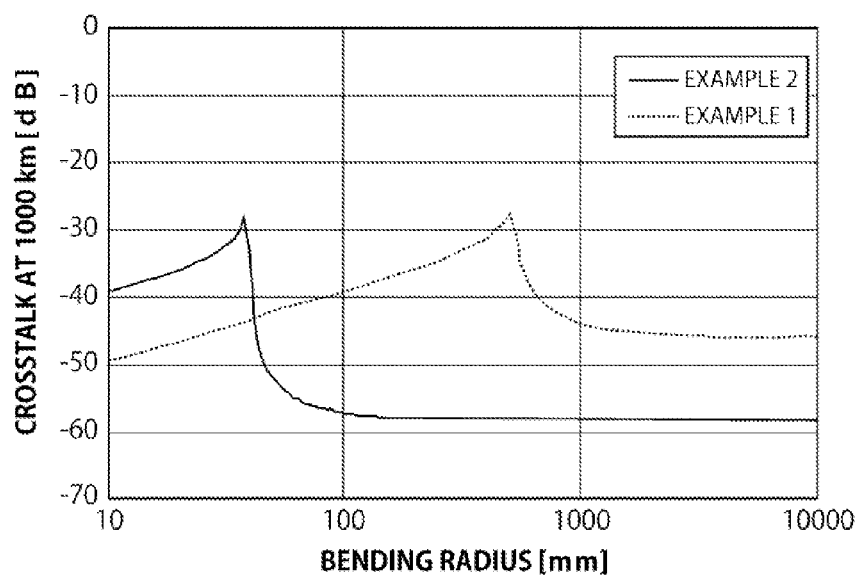
FIG. 11 is a graph illustrating the variations in the crosstalk at 1,000 km of multicore fibers according to Example 1 and Example 2 when the bending radius is changed.

The variations in the crosstalk at 1,000 km of the multicore fibers according to Example 1 and Example 2 when the bending radius is changed are illustrated in FIG. 11. As illustrated in FIG. 11, since the bending radius that a multicore fiber can withstand in practice is approximately 100 mm, it is found that the multicore fiber corresponding to the second embodiment can achieve stable crosstalk against bending in addition to reduced crosstalk.

The invention claimed is:

1. A multicore fiber comprising a first multicore fiber member and a second multicore fiber member, one end face of the first multicore fiber member being spliced to one end face of the second multicore fiber member, wherein
    core end faces of multiple cores in the first multicore fiber member are spliced one-to-one to core end faces of multiple cores in the second multicore fiber member, and
    among the cores in the first multicore fiber member and the cores in the second multicore fiber member spliced one-to-one at the core end faces, at least one core in the first multicore fiber member and one core in the second multicore fiber member spliced thereto have different effective core areas from each other, and
    the core having the larger effective core area has an open end face located opposite to the spliced core end face thereof, the open end face receiving light such that the light propagates through the core having the larger effective core area to enter the corresponding core, and
    wherein a difference in the effective core area difference between a core in the first multicore fiber member and a core in the second multicore fiber member is 45 μm² or smaller.

2. The multicore fiber according to claim 1, wherein
    the cores in each of the first multicore fiber member and the cores in the second multicore fiber member include first cores and second cores having a larger effective core area than the first cores, and
    core end faces of the first cores in the first multicore fiber member and core end faces of the second cores in the second multicore fiber member are spliced one-to-one to one another, and core end faces of the second cores in the first multicore fiber member and core end faces of the first cores in the second multicore fiber member are spliced one-to-one to one another.

3. The multicore fiber according to claim 2, wherein the first cores and the second cores in the first multicore fiber member, and the first cores and the second cores in the second multicore fiber member are arranged adjacent to one another.

4. The multicore fiber according to claim 2, wherein
    a center axis of the first multicore fiber member and a center axis of the second multicore fiber member are aligned with each other, and
    the first cores and the second cores are arranged alternately around the center axes at equal core-to-core distances between the first cores and the second cores.

5. The multicore fiber according to claim 1, wherein the core having the larger effective core area is a core in the first multicore fiber member.

6. The multicore fiber according to claim 1, wherein a difference in the effective core area difference between a core in the first multicore fiber member and a core in the second multicore fiber member is 10 μm² or larger.

7. The multicore fiber according to claim 1, wherein
    a difference in refractive index between the core having the larger effective core area and a clad surrounding the core is smaller than that between the core having the smaller effective core area and a clad surrounding the core, and
    the core having the larger effective core area has a diameter substantially equal to that of the core having the smaller effective core area.

8. The multicore fiber according to claim 1, wherein
    the core having the larger effective core area has a diameter larger than that of the core having the smaller effective core area, and
    a difference in refractive index between the core having the larger effective core area and a clad surrounding the core is substantially equal to that between the core having the smaller effective core area and a clad surrounding the core.

9. The multicore fiber according to claim 1, wherein
    the core having the larger effective core area has a diameter larger than that of the core having the smaller effective core area, and
    a difference in refractive index between the core having the larger effective core area and a clad surrounding the core is smaller than that between the core having the smaller effective core area and a clad surrounding the core.

10. The multicore fiber according to claim 1, wherein the core having a larger effective core area has the larger effective core area through an entire length thereof than that of the corresponding core spliced to the core having the larger effective core area.

* * * * *